Patented Apr. 18, 1933

1,904,699

UNITED STATES PATENT OFFICE

JAMES A. SINGMASTER, OF BRONXVILLE, NEW YORK

PRODUCTION OF CEMENT

No Drawing. Application filed May 24, 1929. Serial No. 365,787.

My invention relates to the manufacture of cement and pertains more particularly to an improved process in which the unburned cement raw materials are heated to the point of incipient fusion or sintering by means of the combustion of fuel admixed with said materials, said sintering being accomplished under the influence of a draft of air while the material being treated is spread out in a relatively thin layer and is maintained in an unagitated condition until the ingredients are firmly held together. The cement raw materials after their preliminary sticking together are subsequently submitted to a second heating to complete the burning.

In the manufacture of Portland cement calcium rich materials such as limestone, chalk or marl are intimately mixed with materials rich in alumina and silica, such as cement rock, clay, shale, or blast furnace slag, in definite proportions. The resulting intimate mixture is then burned at a high enough temperature and for a sufficient length of time for the various ingredients to combine chemically and physically. The resulting clinker is finely ground to produce the cement of commerce.

In order to obtain a uniform, high grade product such as is now demanded, it is necessary to grind each material to a very fine state of subdivision and then to very thoroughly mix the different ingredients in order that each minute particle of any one of the ingredients may be closely associated with the correct amount of each of the other ingredients at the time of burning, with the result that all particles of the burned clinker are uniformly of the desired composition.

The importance of uniform composition in the burned clinker is leading to the gradual adoption of the wet process in which the raw materials are ground wet and are mixed in a water slurry. This change is taking place despite the fact that the water left with the ground and mixed raw materials must first be removed at the expense of, in some cases, an additional filtering step in the operation and, in all cases, the use of considerably more fuel in the burning. The reason for the general adoption of the wet process is, first, that it is easier and cheaper to obtain very fine grinding when the operation is done wet and, second, because it is possible to get much more perfect mixing when the materials are suspended in a water slurry.

In the wet process the material is ground so fine that the mixed slurry is very difficult to filter, so that in many cases filtration is not attempted but the slurry is delivered direct to the clinkering kiln and all the water present evaporated before the ground materials reach the clinkering zone. This results in a considerable increase in the amount of fuel which must be burned in the kiln.

In this country the rotary kiln, because of its simplicity and large capacity, is almost universally used to burn cement clinker. When a rotary kiln is charged with finely ground powders, the rate of rotation must be limited to the point at which a minimum of the powder will be lifted and dropped through the gas stream since, if this happens to any appreciable extent, a considerable part of the material charged will be carried along as dust in the gas stream and lost. The finer the material, the more easily will it dust, and the more slowly must the kiln be run to keep the resulting losses at an economical minimum. Since a relatively small part of the heat required to operate the kiln is actually used to burn the cement it follows that when the amount of material which can be put through the kiln is limited, the thermal efficiency of the kiln is also limited, and anything which tends to decrease the cement making capacity of the kiln increases the amount of fuel required per unit of product. Modern fine grinding makes this problem of kiln capacity very important to the cement manufacturer and any method which will economically treat the kiln feed so that the kiln can run at appreciably higher capacities without injuring the quality of the resulting clinker, will effect very real savings.

When two or more materials, which differ in size and shape of particle and in specific gravity, and which have previously been intimately mixed together, are rolled around, as cement raw materials are in passing through a rotary kiln, a certain amount of segregation of each ingredient will take place. In other words the present method of burning finely ground cement raw materials in a rotary kiln to some degree undoes the mixing which has previously been accomplished at considerable expense. When in addition to the rolling motion obtained in the kiln there is also a fairly rapid stream of gas passing over the surface, and when in addition a considerable volume of gas is being generated within the body of the material, as happens in a cement kiln, due to evolution of carbon dioxide from the limestone, a still further segregation results because some of the ingredients dust more easily and so are removed to a greater extent than others. The dust obtained from rotary kilns in cement plants is usually of different composition from the feed even after making allowance for coal ash and volatile materials. Commercial cement usually differs materially in composition from that which laboratory tests indicate to be most desirable, for the reason that an excess of certain ingredients is less harmful than an excess of other ingredients, and since it is not possible to insure complete combination of all particles in the clinker, that ingredient which is least harmful when present uncombined in the finished clinker is usually added in excess at the beginning. For example, it is believed that the best cement should contain a ratio of combined calcium oxide to silica, or its equivalent, of about 2.8, but no cement manufactured by the ordinary process actually contains this much combined calcium oxide because it is impossible with a single burning to produce such a cement without having present so much free or uncombined calcium oxide that the resulting product will not be satisfactory for the purpose to which cement is put. Because of this well known fact it has even been proposed to finely grind ordinary cement clinker and then mix it with additional calcium oxide and burn it a second time in the rotary kiln. The resulting product is said to be superior to that made by the regular process.

By causing the very finely ground and thoroughly admixed cement raw materials to be sintered together before they are fed to the rotary kiln, my invention avoids these difficulties. The binding of the ingredients together greatly reduces dusting and, since any material separated from the mixture by dusting will be of uniform composition, differential dusting will be prevented. The mechanical segregation, referred to above as objectionable, will also be eliminated by following my process. An advantage gained thereby is that the optimum proportions of the various ingredients may be mixed without producing an objectionable excess of any of them in the finished product. For example, the ratio of calcium oxide to silica, or its equivalent, may be made to closely approach 2.8 in the original mixture without causing the finished cement to contain an objectionable amount of free calcium oxide.

When used in conjunction with the wet process of making cement, my invention further provides means whereby the separation of the finely ground raw materials from the water of the slurry by filtration is greatly facilitated by mixing the relatively coarse granular fuel, necessary for sintering, with the slurry before the latter is filtered. This increases the capacity of the filtering equipment used and reduces the amount of water left in the filter cake thereby reducing the amount of fuel required to evaporate the water before the clinker can be burned. Other advantages will become apparent.

In the preferred practice of my invention I incorporate a suitable amount of carbonaceous fuel, such as crushed anthracite coal or coke "breeze" with a previously prepared finely pulverized admixture of the raw materials used for cement manufacture. In using my invention in a cement plant in which the wet process is employed, I prefer to add the relatively fine fuel to the slurry of raw materials, since this is a convenient point of addition and because the presence of the fuel particles aids in the filtration of solid material from the slurry. Alternatively I may incorporate the fuel with previously filtered moist unburned materials by an ordinary mixing operation in a pug mill or the like. In applying my process in a plant in which the dry process of cement manufacture is used I prefer to moisten the finely pulverized unburned cement raw materials, after which I mix them with the crushed fuel by any convenient mixing operation. The moist admixture of fuel and unburned cement material may be passed through fluted rolls, or the equivalent, so as to form it into agglomerates or granules or it may be transferred in bulk form directly from the pug mill or other milling device to the sintering operation.

The fuel mixed with the raw materials is preferably crushed to such fineness that it will pass through one-quarter inch punched holes, but not through one-sixteenth inch punched holes. These particles are relatively large as compared with the cement raw materials which are pulverized to such a degree that about eighty percent will pass through a two hundred mesh screen. The size of the coal particles may be varied to give the best results in the filtering step (where the wet process of mixing is used) and to provide a satisfactorily previous layer on the pallettes. If desired, different sizes of crushed coal may be added before and after the filtering step to obtain the best results in the filter and on the sintering machine.

The amount of fuel required varies because the amount of carbon dioxide to be removed, as well as the water in the feed to the sintering machine, varies. In general from eight to fifteen percent of the weight of the raw cement materials will be required.

In the simplest embodiment of my invention, the mixture of cement raw materials and fuel, thus prepared, is deposited, preferably from a swinging spout and in such a manner as to avoid packing, in a shallow layer on a tray or pallette of metallic or other heat-resisting composition, said pallette having a perforated bottom. The material in the pallette is subjected to a blast of flame sufficient to expel the moisture and ignite the fuel in the exposed surface. The combustion of the fuel is supported and promoted by a draft of air which is caused to pass downwardly through the material and through the foraminous hearth. The igniting flame may be produced by the combustion of producer gas, oil, pulverized coal or the like, the heat being directed upon the top of the layer of material. The continuously moving pallette, after passing over the draft box, carries the charge to the end of the machine where it is dumped.

The temperature of the material during the combustion of the contained fuel may be so high that it may damage the perforated bottom of the pallette, and for this reason I prefer to place on the top of the pallette a layer of previously sintered or partially sintered coarse agglomerates of uniform size and large enough so they will not fall into and obstruct the holes of the pallette. This will prevent the combustion of material in direct contact with the metal and will serve as an effective heat insulation. This material may be obtained by passing the product from the sintering operation over one or more screens of suitable mesh and returning the desired amount of granular material of the desired size to be used as a layer between the pallette and the mixture of fuel and unburned cement. If insufficient material is obtained in this way, some of the sintered product can be crushed to produce granules of the desired size. The porosity of the layer on the grate may be varied by varying the size or quantity of the granules of this layer. It may also be desirable to mix some of this granular material with the charge itself in order to regulate the porosity and consistency of the entire bed.

The apparatus to be used with my process is not part of the invention and may be of any suitable type. For the purpose of describing an application of the first step of my process, reference will be made to a continuous sintering machine, such as that described in Liddell's "Handbook of Non-Ferrous Metallurgy", pages 327 to 340, in connection with the sintering of ores.

I am familiar with the fact that it has been proposed to substitute the continuous sintering machine for the rotary kiln as a means of clinkering cement. This proposal has not been successful commercially in spite of the fact that the sintering machine is much more efficient thermally than the rotary kiln. One reason for this may be that the type of fusion taking place on the sintering machine is so rapid and of such short duration that only a very incomplete reaction takes place between the different constituents of the cement mixture with the result that, although a firm clinker is obtained, it nevertheless contains considerable percentages of unreacted materials and when it is ground the resulting cement is of inferior quality. The purpose of my invention is to take advantage of the effect of this preliminary sintering in holding the several ingredients of the mix together, so that when the final burning takes place in the rotary kiln, or other furnace, the capacity of the furnace is increased and the various ingredients are present in the proper proportions in all parts of the charge, with the result that when sufficient time is given for the reactions to complete themselves the resulting cement will be of superior quality, both as to uniformity and composition.

Having bound together the finely ground raw materials by sintering, the sintered material may be fed directly to the rotary or other kiln for the final burning operation. I prefer, however, to pass the product through a suitable coarse crusher to break up large lumps and then to pass the resulting coarsely crushed product over suitable screens. In this way I secure a certain amount of relatively fine material which can be mixed with the unsintered, very fine cement raw materials and returned to the sintering machine. These returned fines help to keep the charge to the sinter machine more open and porous to air. If desired they may even be mixed with the unfiltered slurry, when my process is used in connection with the wet process of manufacturing cement, and thus assist the granular fuel in making the filtering operation more easily and cheaply carried out. From these screens I may also obtain the granular product which I prefer to use to protect the pallettes of the sintering machine as previously described.

When the final burning is to be accomplished in a rotary kiln I prefer to so choose and arrange the crushing and screening equipment that all of the product of the sintering machine not required for mixing with the raw charge or for protecting the pallettes will be in the form of relatively uniform sized lumps or granules, such for example that they will all pass through one inch punched holes and all remain on one quarter inch punched holes.

If the final burning is to be accomplished in any other kind of kiln, the crushing and screening apparatus is so selected and arranged that the product will be in the form best adapted for use in the particular kiln to be used.

The sintering material is then fed to a suitable kiln in which it is burned to cement in the usual way. When a rotary kiln is used for this operation I prefer to adjust its speed so that the material travels through the kiln as rapidly as possible without allowing unburned material to leave the kiln when the highest practical temperature is maintained therein. The clinker after suitable cooling is then ground in the usual way to form the finished cement.

My process may be used in the production of so-called "high early strength" cements which are in much demand because of their high quality and because roads and structures built with them may be put in use much quicker than those built with ordinary cement. By the use of my process such a cement may be obtained by mixing the original ingredients in the desired proportions so that the resulting cement will have the desired composition. For example, if a cement is desired in which the ratio of combined calcium oxide to silica, or its equivalent, is about 2.8, the ingredients may be proportioned in the original mix to give this ratio in the finished cement and the product will not contain an objectionable amount of free calcium oxide.

For the reasons suggested, the use of my process permits a great expansion in the capacity of a cement plant equipped with rotary kilns. The fuel consumption is greatly reduced because the sintered material is of such a nature that a rotary kiln can handle a larger load with a resultant higher thermal efficiency. There is also less tendency for this material to form rings inside the kiln.

The burning of cement with fuel in a vertical shaft kiln is not new. In this process the raw materials are ground and thoroughly mixed and formed into briquettes which are charged into the vertical kiln together with the necessary amount of fuel. This process is thermally highly efficient but the small capacity of the kiln coupled with the labor involved in briquetting are such as to make it uneconomical in this country. It will be evident that my method of giving the material a preliminary fusion or sintering, resulting in the formation of appropriately sized agglomerates, may be used before a final burning in a continuously operated shaft kiln, instead of before that in the customary rotary kiln with its lower thermal efficiency. By following this procedure, the necessity of briquetting will be eliminated.

By the term sintering in the description and claims I refer to a fusion, or partial fusion, sufficient to hold the ingredients together, as distinguished from the complete burning required to produce the finished cement.

It is apparent that many modifications of my preferred process may be made and that my invention may be applied in many different ways and to other types of cements and it is not intended to hereby limit it to the particular applications described.

What I claim is:

1. A process for manufacturing cement comprising, mixing a slurry of pulverized raw cement-materials with sufficient finely divided solid fuel to produce, upon combustion, sintering of the cement mixture, filtering said mixture, igniting the fuel in the filter-cake, drawing air through the mixture to support and promote the combustion of the fuel, and subjecting the sintered mass to further heat to complete the burning of the cement.

2. In the manufacture of cement, the steps comprising mixing finely divided fuel with a slurry of pulverized cement raw materials, filtering said slurry, and igniting and promoting combustion of the fuel in the filter-cake.

3. In the manufacture of cement, the steps comprising mixing crushed coal with a slurry of pulverized cement raw materials, filtering said slurry, and igniting and promoting combustion of the coal in the filter-cake.

4. In the manufacture of cement, the steps comprising mixing finely divided solid fuel with a slurry of pulverized raw cement materials, filtering said mixture, igniting the fuel in the filter-cake and drawing air through the mixture to support and promote combustion in the fuel.

5. In the manufacture of cement, the steps comprising mixing a quantity of crushed fuel and previously sintered material with a slurry of cement raw materials, filtering said material, igniting the fuel in the filter-cake and supporting combustion therein by a draft of air through the mixture.

6. In the manufacture of cement, the steps comprising mixing crushed fuel and previously sintered material with a slurry of cement raw materials, filtering said mixture, passing the filter-cake through a suitable apparatus to form agglomerates, spreading the mixture on a foraminous hearth so as to avoid packing, igniting the fuel in the exposed surface, passing a draft of air through the mass to sustain and promote combustion of the said fuel.

7. A process for manufacturing cement comprising, mixing crushed fuel and previously sintered material with a slurry of cement raw materials, filtering the mixture, spreading a layer of larger granules of previously sintered material upon a foraminous hearth, spreading a layer of the mixed fuel and cement materials on the aforesaid layer, igniting the fuel in the exposed surface, supporting and promoting combustion of the remainder of the fuel by a draft of air through the layers and the foraminous hearth, crushing the resulting mass and screening it to recover several sizes of material, returning the smallest size to the slurry, returning the next larger sized granules to form a layer on the foraminous hearth, and subjecting the remaining relatively uniformly sized granules to sufficient heat in a rotary kiln to complete the burning to cement.

8. In the manufacture of cement, the steps comprising mixing fuel particles of about $\frac{1}{18}$ to $\frac{1}{4}$ inch with a slurry of pulverized cement raw materials, filtering said slurry, and igniting and promoting combustion of the fuel in the filter cake.

9. In the manufacture of cement, the steps comprising mixing fuel particles of about $\frac{1}{18}$ to $\frac{1}{4}$ inch with a slurry of cement raw materials which have been pulverized so that about 80% will pass through a 200 mesh screen, filtering said slurry, and igniting and promoting combustion of the fuel in the filter cake.

10. In the manufacture of cement, the steps comprising mixing finely divided fuel with a slurry of pulverized cement raw materials, the fuel being present in the proportions of about 8 to 15% by weight of cement raw materials, filtering said slurry, and igniting and promoting combustion of the fuel in the filter cake and subsequently heating the resulting sintered mass to complete the burning of the cement.

11. In the manufacture of cement, the steps comprising mixing the finely divided fuel with a slurry of pulverized cement raw materials, filtering said slurry, igniting and promoting combustion of the fuel in the filter cake, crushing the resulting mass and separating the particles between $\frac{1}{4}$ and one inch and subjecting them to sufficient heat to complete the burning to cement.

In testimony whereof, I have signed my name to this specification this 22nd day of May 1929.

JAMES A. SINGMASTER.